Dec. 4, 1945.   F. R. HARRIS   2,390,300
SHOCK-ABSORBING FLOATING DRY DOCK
Filed May 20 1943   3 Sheets-Sheet 1
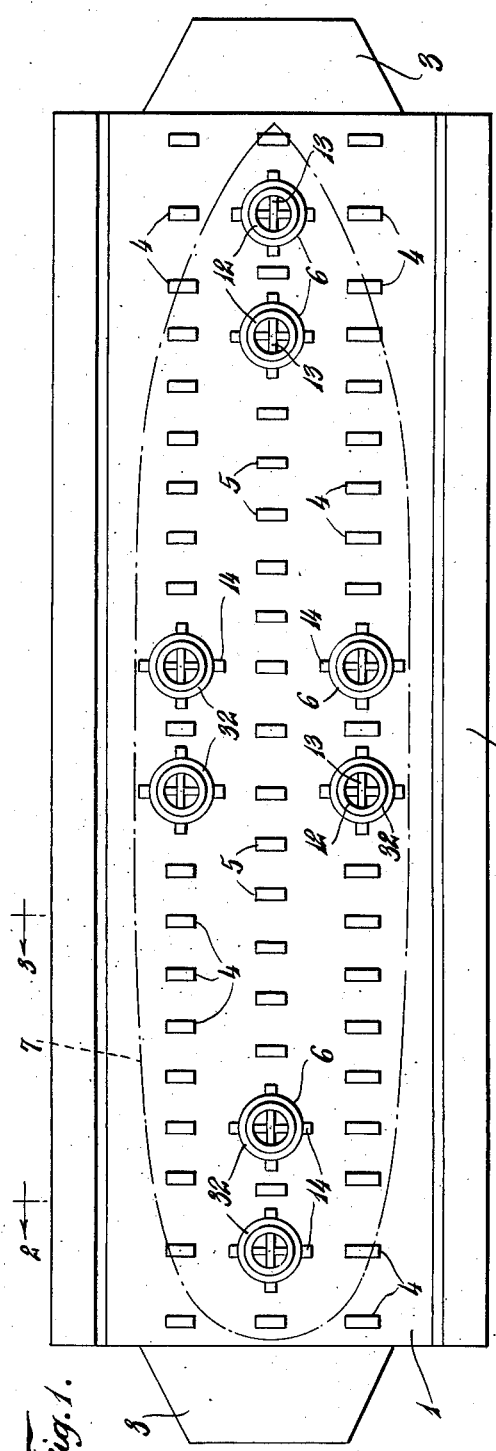
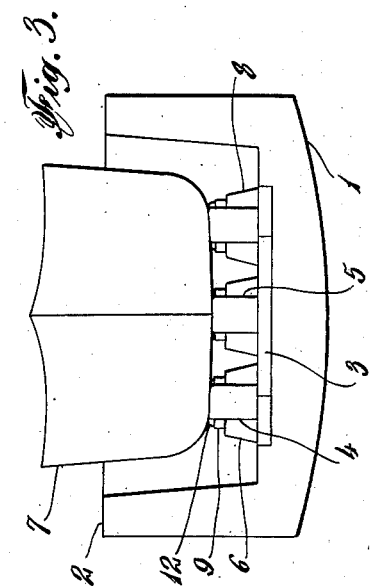
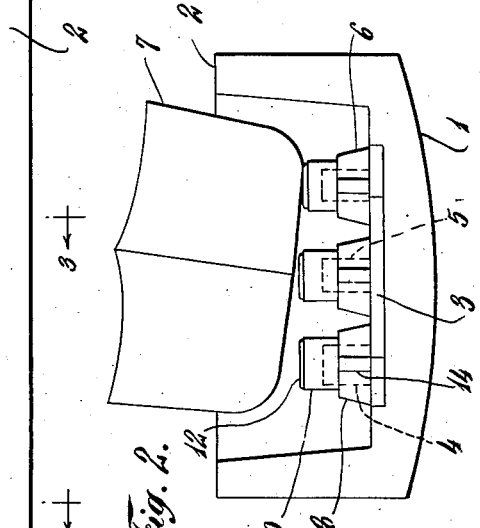
INVENTOR.
Frederic R. Harris
BY
William F. Nickel
ATTORNEY Dec. 4, 1945.   F. R. HARRIS   2,390,300
SHOCK-ABSORBING FLOATING DRY DOCK
Filed May 20, 1943   3 Sheets-Sheet 2
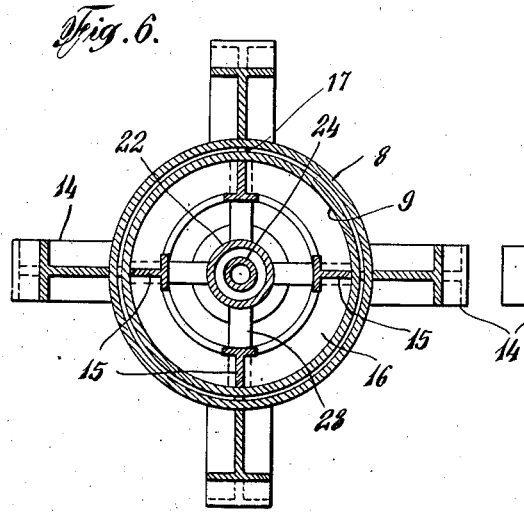
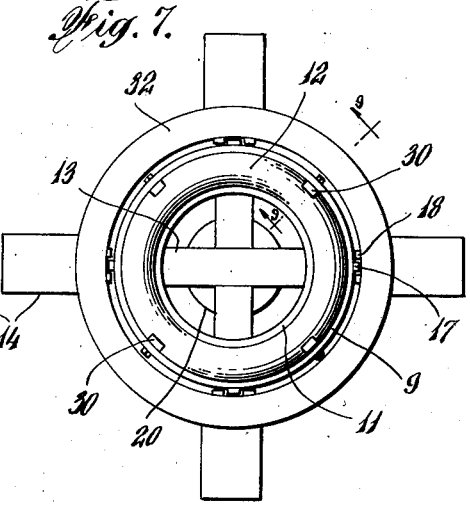
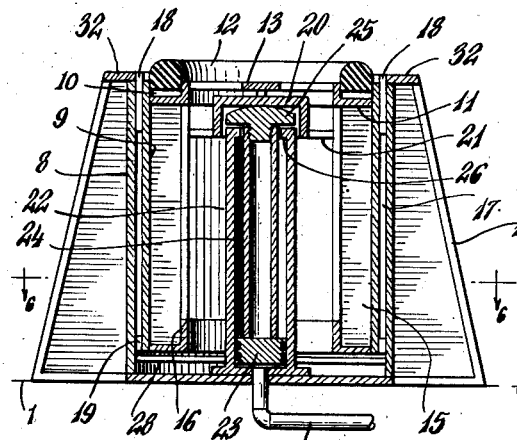
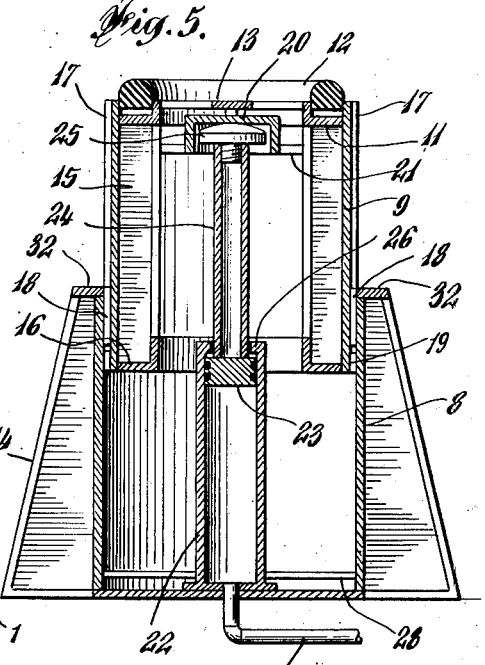
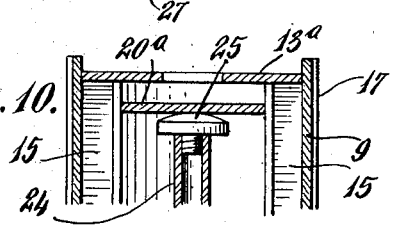
INVENTOR.
Frederic R. Harris
BY
William F. Nickel
ATTORNEY Dec. 4, 1945.    F. R. HARRIS    2,390,300
SHOCK-ABSORBING FLOATING DRY DOCK
Filed May 20, 1943    3 Sheets-Sheet 3
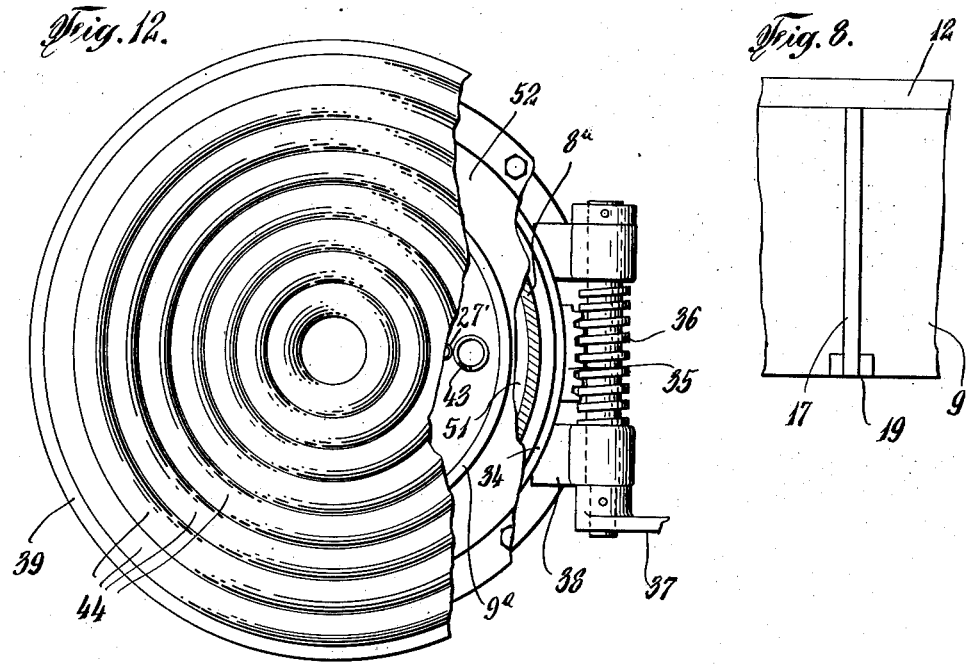
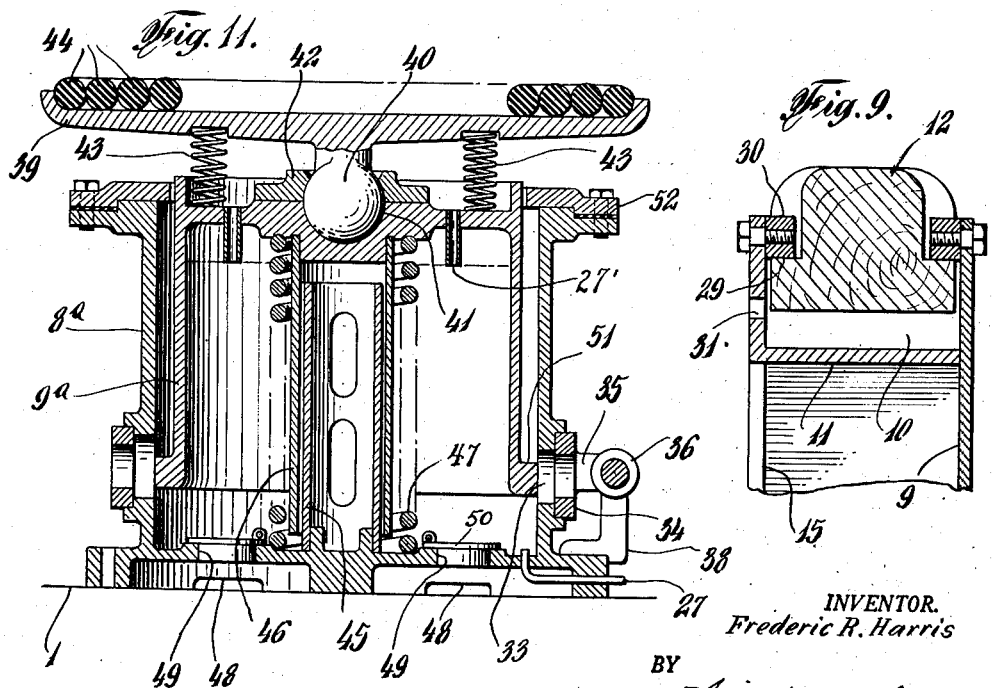
INVENTOR.
Frederic R. Harris
BY
William F. Nickel
ATTORNEY Patented Dec. 4, 1945

2,390,300

UNITED STATES PATENT OFFICE 2,390,300

SHOCK-ABSORBING FLOATING DRY DOCK

Frederic R. Harris, New York, N. Y.

Application May 20, 1943, Serial No. 487,735

12 Claims. (Cl. 114—45)

This invention relates to improvements in dry docks; particularly floating docks which can be transferred from one point to another, and even moved over long distances at sea, to places where they are needed for use.

A dock of this type, however, can be utilized only in a sheltered bay or harbor where the surface of the water has little or no vertical movement. If exposed to the action of waves or swells, a floating dock will naturally pitch or roll; and anything like safe operation will be impossible. Whenever, under such conditions, an attempt is made to raise a ship with a floating dock, the two structures swing independently, up and down out of synchronism and out of phase. The ship and the dock will therefore come together repeatedly and with great violence; and heavy damage thus ensues. Were a ship of large size to be put into a floating dock in a ground swell of, say, six feet from crest to trough, whole sections of the ship's bottom would be crushed in, much of the strength of the hull destroyed and great additional damage wrought upon the dock itself, before the vessel could be settled firmly upon the keel blocks. This result is due to the fact that the dock, when submerged, cannot be pumped out and made to rise in the water and lift the vessel rapidly enough to prevent such disastrous collisions.

Of course, a floating dock is always stationed at a site where no wave action prevails; if such a site is available. But in such a locality there is seldom enough water for submersion of the dock. The depth required for large vessels sometimes reaches 70 to 80 feet; and in a well-protected harbor a stretch of water having such a depth can hardly ever be found. Hence, if a basin for the dock in a harbor is necessary, it must generally be excavated by dredging, with the expenditure of much time and money. A great advantage would therefore be gained if floating dry docks could be operated in open waters, where sufficient depth is offered, in spite of the difficulties that wave action entails.

It is the chief object of my invention to provide a floating dock by means of which vessels of the maximum size can be taken and serviced in open waters, such as roadsteads and similar areas, where ground swells and waves are always encountered. To achieve this end, shock absorbing devices are mounted on the pontoon deck or floor of the dock to cushion the vessel as it comes to rest in the dock upon the supports which engage its keel and bottom.

In preferred form the shock absorbing effect is given by separate hydraulic units on the deck or floor of the dock, each unit receiving and confining a quantity of water, but discharging it slowly as the weight of the ship in the dock acts thereon. It is well known that the velocity of a jet issuing from an orifice in a receptacle containing a liquid is a direct function of the hydrostatic head at the orifice; and this head or pressure is proportional to the height or depth of the liquid between the orifice and the surface. The discharge of the liquid is resisted by friction at said orifice; internal between the particles of the liquid itself; and external between the liquid and the edge of the orifice. A greater head or outside pressure added to an existing head will increase the velocity of outflow at the orifice, and as the outflow continues the level of the liquid will fall in consequence. If a piston be fitted to the inside of the container and pressed down upon the liquid, the surface of the latter will yield but will still resist, for the fall or sinking of the surface of the liquid will then take place at a rate determined by the velocity of exit. With such containers having orifices and plungers disposed on the floor of a dock beneath a rolling or pitching ship, such movement of the ship in docking can thereby be divested of hazard if the containers are sufficiently large or present in such number that the quantity and rate of displacement of the discharged water counterbalance the kinetic energy of the rocking hull. The ship will thus be cushioned, its kinetic energy absorbed, and all risk of damage obviated.

My invention embodies this principle. In practical form, the dock bears on its floor a number of cylinders in which are upward projecting but depressible plungers. Water in the cylinders resists inward or downward motion of the plungers, but the water is expelled as the ship forces the plungers down. Hence, as the weight of the ship falls upon the plungers, the escaping water permits them to yield, but gives an excellent cushioning effect.

The invention is illustrated in several embodiments on the drawings; but the examples given can of course be modified in many respects without departing from the principle underlying them.

On said drawings:

Figure 1 is a top plan of a floating dock equipped according to my invention.

Figure 2 is a vertical section on the line 2—2 of Figure 1, showing a ship as it may be rocked by waves in the dock.

Figure 3 is a similar section on the line 3—3 of Figure 1, showing the ship supported on the floor of the dock.

Figure 4 is a vertical section through one of the shock-absorbing units, with the plunger depressed.

Figure 5 is a similar view showing the parts with the plunger elevated.

Figure 6 is a horizontal section on the line 6—6 of Figure 4.

Figure 7 is a top plan of said unit.

Figure 8 shows guiding means for the inner cylinder or plunger in the outer cylinder of the unit.

Figure 9 is a vertical section on part of line 9—9 of Figure 7.

Figure 10 shows another type of inner cylinder for this unit.

Figure 11 is a vertical section of a modified form of hydraulic shock absorbing unit; and Figure 12 is a top plan thereof.

The same numerals identify the same parts throughout.

With reference first to Figures 1 to 9 inclusive, I show the outline of a floating dock consisting of a pontoon body 1 and side or wing walls 2, with outrigger platforms 3 at the two open ends. On the deck of the pontoon or floor of the dock are two longitudinal rows of bilge blocks 4 flanking a center row of keel blocks 5; and in line with these blocks are the mechanisms, indicated at 6, for preventing severe shocks or collisions between the floor of the dock and the bottom of a ship 7 when the dock is about to lift the vessel out of the water. The dock is submerged in the usual way by flooding its interior compartments till the pontoon is deeper in the water than the vessel's keel, and only the tops of the wing walls 2 are above the surface. The ship is then moved into the dock through one of the open ends till it floats fully between the walls 2. Then the dock is raised and the vessel lifted by pumping the water out of the dock. In practice the latter may consist of a single hull or pontoon 1 with walls 2, or it may be built as if the dock were divided transversely into sections, each with a portion of the walls 2 thereon, and the sections assembled side by side with the portions of the two walls in alignment, to give the dock the form which Figure 1 indicates.

The apparatus for preventing shocks between the dock and the bottom of the ship consists of as many of the units 6 as are necessary upon the floor of the dock, and in any required position. If the ship rolls or pitches, its bottom will strike harmlessly on one or more units 6, as outlined in Figure 2, and such motion gradually suppressed as the dock is raised and the ship settles into the position shown in Figure 3.

These units, as shown in Figures 4 to 9 inclusive, have the form of outer cylinders 8 open at their upper ends to receive inner cylinders 9. The cylinders 8 may be welded directly around the lower edges to the deck of the pontoon 1 or be closed at the bottom and secured to the deck in any suitable way. The keel blocks and bilge blocks are slightly higher than the cylinders 8 but the inner cylinders 9 are projected in operation above the tops of the keel and bilge blocks and forced down by the ship, to have the desired effect. The inner cylinders are open at both ends. At the top of each cylinder 9 is an annular channel 10, which may be formed by welding curved angle-iron 11 to the inside of the rim of this cylinder, with one flange of the angle-iron on the inner rim and vertical. The channel 10 forms a seat to receive an annular gasket or cushion 12 of soft, elastic wood, rubber, or some other suitable material, in one piece or in several sections, to engage the bottom of the ship when the dock is being pumped out. The top of the inner cylinder is stiffened by cross-braces 13 affixed to the inside edge of the channel 10; and the outer cylinder 8 is welded or otherwise attached to flanged stiffening posts or buttresses 14, fastened to the floor of the dock. The inner cylinder is also stiffened by vertical inside ribs 15, extending from the channel 10, down to an annular ring 16 at the bottom. This ring is formed of curved angle-iron, welded in proper position to the bottom or inner end of the cylinder 9 and ribs 15. On the outer face of this cylinder are straight vertical ribs 17, to move between guides 18 on the inner face of the cylinder 8 at the top. The ribs 16 are each flanked by stops 19 at their lower ends to engage the guides 18 and limit the upward movement of the cylinder 9.

The inner cylinder contains a member forming a pocket or seat 20 just below the braces 13, opening downward and affixed by connections or braces 21 to the flanges on the inner edges of the ribs 15. Within the cylinder 8 is a central cylinder member or air casing 22, affixed to the bottom thereof and containing a plunger member 23. This plunger member or piston is connected by a rod 24 to an outside head 25, that presses against the seat 20. A flange or shoulder 26 in the upper end of the casing 22 encircles the rod 24 and provides a stop for the piston 23. The lower end of the casing 22 is connected to an air reservoir, not shown, by a pipe 27. Braces 28 connect the casing 22 and outer cylinder at the bottom.

The arrangement of the cushioning units on the floor of the dock is diagrammatically illustrated in Figures 1, 2 and 3. The inner cylinders are raised by air pressure under the pistons 23 to the position shown in Figure 5. When the dock is submerged the inner and outer cylinders are filled with water; and when the dock is raised by pumping out the pontoon 1 and the chambers in the side wings 2, the bottom of the vessel approaches the floor of the pontoon 1, and makes contact with the upper ends of the inside cylinders 9. The weight of the vessel now gradually forces the inner cylinders downward. At this stage, the tops of the inner cylinders 9 will be closed more or less by the plating on the vessel's bottom. In any event, the spaces between the gaskets 12 and the bottom of the vessel will be reduced; and the inner cylinders thus become plungers so that, as the vessel settles toward the keel blocks and bilge blocks it will be retarded by the water in the cylinders 8 and 9. The water can be expelled of course but only through the passages or spaces between the walls of the two cylinders and the bottom of the vessel and the gaskets 12. Extra openings in the outer cylinders near the deck can be added, if required.

The rate of displacement of the water from the inside of the containers provided by these inner and outer cylinders will therefore be just enough to enable the vessel to settle very easily. If there is a sea or ground swell running, so that the vessel rolls or pitches, the water cushions the vessel very effectively and prevents damage. In rolling or pitching, any part of the ship will require from five to ten seconds to complete its movement; sometimes as much as fifteen seconds. With waves running, say, six feet or eight feet high, in the neighborhood of the dock, the ship in the dock will probably not move vertically more than three feet or four feet. The kinetic energy of the hull of a large vessel having this kind of motion, even though the rate is low, will be very great because such energy is always proportional to the square of the velocity. Such energy, however, can be opposed by the inertia of the mass of water confined in the aggregate by the various hydraulic shock absorbers, and the design is such that the mass of total water multiplied by the square of the velocity of the escape of the water will be equal to the mass of the ship multiplied by the square of the velocity of its movement in pitching or rolling. One force can thus be made to balance the other; and the cushioning of the vessel is very fully accomplished.

The air in the chambers 22 need not be relied upon to give any cushioning effect but merely lifts the inner cylinders 9 into projecting position. All or most of the shock absorbing is provided by the water in the two cylinders. Of course, the edges of the inner cylinders 9 may be inclined if necessary to conform to the contour or slope of the bottom; and the ribs 17 and guides 18 keep the inner cylinders from turning in the outer cylinders. The planes of the gaskets 12 will thus always be fixed. If desired, closed air chambers can be built into the cylinders 9 so that they will rise by their own buoyancy when the dock is submerged.

The gaskets 12 have recesses or shoulders 29, engaged by stops 30 secured to the inside of the cylinders 9 at the rims to prevent displacement from the seats 10. Openings 31 at one side admit water to the seats 10, to lift the gaskets and cushion them. The ports may be so situated as to be closed more or less when the gaskets are forced down and the cushioning thus regulated. The tops of posts 14 are united by a brace ring 32.

In Figure 10, the inner cylinder has a closed but countersunk top 13a, for the gasket 12; the rim keeping the gasket in place. Inside are cross-braces 20a welded to the ribs 15 for engagement by the head 25. This top is preferably open in the middle.

Figures 11 and 12 indicate a modification having an outer cylinder 8a and inner cylinder 9a. Near the base of the former are lateral ports 33, controlled by a sleeve valve 34, with corresponding ports therein. This valve bears a worm rack 35 clear of the ports and meshing with a worm 36. This worm is carried in bearings 38 and is turned by a crank arm 37, which may be operated by connections within the pontoon 1. Thus, the valve can be shifted to regulate the free area of the ports 33. The inner cylinder is shown as closed at its outer end; thus being converted into a plunger; and on the top is a plate or contact head 39. This head is dished and has a central journal or spherical head 40 which rests in a recess 41 in the top of the plunger 9a and is held by a retainer 42, thus making a ball joint which allows the head to tilt in any direction. Several compression springs 43 are interposed between the plunger 9a and the head 39, and seated upon the outer end of the plunger 9a. Within the rim the top face has a gasket or lining 44 consisting of rings of rubber or the like or even coils of hempen cables. To the bottom of the outer cylinder and top of the inner one are affixed telescoping apertured tubular members or guides 45 and 46 respectively, surrounded by a compressed helical spring 47, tending to project the inner cylinder upward. The outer cylinder 8a is again connected to an air tank by a conduit 27.

Separate air tanks for each of the hydraulic units may be used, or a single tank joined to said units by branch piping. The connections to the units will always be controlled by suitable valves.

With this form, when the dock is sunk water enters the unit through the ports 33 and at the top of the cylinder 8a. Both the pistons are filled. When the ship is in the dock and the latter pumped out, the head will tilt on the ball joint at the center; if the ship heaves and the bottom hits it at an incline; and as the dock rises higher, the plunger 9a is forced down and the water expelled around the plunger and through the ports 33 and sleeve 34. When the inner cylinder overruns the ports 33, its descent is slower because all the water in the unit must now be expelled through the space between the inner and outer cylinders and out at the top as the ship comes to rest on the blocks 4 and 5. Air can be admitted through the pipe 27 at any pressure required to rise in the cylinder 9a and form a layer in the top over the water and cushion the first impact of the ship's bottom on the shock absorber units.

To facilitate this action small sections of tubing 27' are made fast in apertures in the top of the plunger 9a, projecting downward and inward a short distance. As the dock sinks and the water rises in the unit, beneath the plunger 9a, it will trap a volume of air below the top of the plunger as soon as it rises to the level of the inner ends of the tubes 27'. The air will escape through the tubes, but will flow out slowly, giving the required cushioning effect before it is all expelled.

The lower part of the cylinder 8a will have openings 48 and 49, the latter controlled by oneway acting valves 50 to admit water and supplement the ports 33 when the plunger rises. The valves 50, however, will not permit the escape of water.

The inner end of the plunger 9a has a flange 51, and the upper end of the cylinder 8a has a top ring 52 affixed thereon, and having its inner edge projecting to engage the flange when the plunger is at the upper end of its lift. Thus, separation of the plunger and outer cylinder is avoided. The inner edge of the ring 52 is spaced from the plunger to allow water to enter the cylinder 8a and be forced out again.

The constructions described above are well adapted to serve the purposes of the invention; but I, of course, do not wish to be limited to details set forth herein, as these may be varied in many respects without departure from the principles of my invention.

Having described my invention, what I believe to be new and desire to secure and protect by Letters Patent of the United States is:

1. The method of lifting a vessel in a floating dry dock, consisting in submerging the dock, shifting the vessel into the dock, raising the dock, retaining water between the vessel and the dock, displacing said water by the action of the weight of the vessel, and retarding the displacement of said water to control the engagement of the dock with the bottom of said vessel.

2. The method of lifting a marine vessel consisting in submerging a floating dry dock, confining water in separate masses on the floor thereof, shifting a vessel into the dock, raising the dock and displacing confined water by the weight of the vessel, and controlling the displacement of said water to cushion the bottom of the vessel as it settles in said dock.

3. A floating dry dock having a deck constituting a floor and ship-engaging means thereon, said means comprising fluid containers each having a depressible member to project therefrom, the containers having open spaces to admit water beneath said members to oppose depressing movement thereof, and connections for admitting air into said containers.

4. A shock absorbing unit comprising a cylinder open at one end, a plunger therein, the cylinder having ports adjacent the opposite end, a sleeve valve having openings to register with said ports, means for adjusting said valve and a tiltable head joined to the center of the plunger at the outer end of same.

5. The unit according to claim 4 wherein compression springs are mounted between the head and the plunger.

6. A shock absorbing unit for a floating dry dock comprising a cylinder, a plunger therein to project from one end, an air casing in the cylinder, a piston in the casing, a rod attached to the piston, and projecting from the end of the casing, the plunger having an internal seat, and a head on the outer end of the rod to abut said seat.

7. A shock absorbing unit for a dry dock comprising a cylinder having one end open, flanged posts buttressing the cylinder, a plunger therein, with spaces between same and said cylinder, cross braces in the outer end of the plunger, a ring attached within the rim at the outer end of the plunger, a ring at the inner end of the plunger, and reinforcing ribs extending from one ring to the other.

8. The unit according to claim 4, wherein the cylinder and plunger have internal mutually engaging guides, and a spring in the cylinder enveloping said guides in position to force the plunger outward into projecting position.

9. A hydraulic cushioning unit comprising a hydraulic cylinder, a plunger therein, said unit having inlet openings, an air pipe entering said cylinder, and air tubes of small diameter opening through the plunger and projecting inward of the head thereof, for the purpose set forth.

10. A dry dock having a floor, and means on said floor to engage the bottom of a ship, said means comprising fluid containers with open tops and depressible members therein movable to project through said tops, said members being of smaller diameters than said containers at the tops, leaving a space surrounding each of said members thereat for the admission and discharge of fluid from said containers.

11. A dry dock having a floor, and means on said floor to engage the bottom of a ship, said means comprising fluid containers with open tops and depressible members therein movable to project through said tops, said members being of smaller diameters than said containers at the tops, leaving a space surrounding each of said members thereat for the admission and discharge of fluid to and from said containers, telescoping members at the centers of said containers, and means at the bottom of said containers to admit compressed air to said containers to actuate said depressible members.

12. A shock-absorbing unit for a floating dry dock comprising a cylinder having an open top, a plunger in the cylinder movable to project through said top, said plunger being of smaller diameter than the container at the top, leaving a space surrounding the plunger thereat through which fluid may be admitted to and discharged from said cylinder, telescoping members at the center of the cylinder, and means for admitting compressed air into the cylinder to actuate the plunger.

FREDERIC R. HARRIS.